US012397811B2

(12) United States Patent
Mehmedovic

(10) Patent No.: US 12,397,811 B2
(45) Date of Patent: Aug. 26, 2025

(54) DRIVING SYSTEM WITH SECURING OF AUTOMATED TRANSVERSE GUIDANCE IN HANDS-OFF DRIVING OPERATION, CORRESPONDING METHOD AND CORRESPONDING SOFTWARE

(71) Applicant: Bayerische Motoren Werke Aktiengesellschaft, Munich (DE)

(72) Inventor: Almir Mehmedovic, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/114,061

(22) Filed: Feb. 24, 2023

(65) Prior Publication Data
US 2023/0271624 A1 Aug. 31, 2023

(30) Foreign Application Priority Data
Feb. 25, 2022 (DE) ...................... 10 2022 104 585.4

(51) Int. Cl.
*B60W 50/14* (2020.01)
*B60W 60/00* (2020.01)

(52) U.S. Cl.
CPC ........ *B60W 50/14* (2013.01); *B60W 60/0015* (2020.02); *B60W 60/0053* (2020.02)

(58) Field of Classification Search
CPC ............. B60W 50/14; B60W 60/0015; B60W 60/0053; B60W 40/09; B60W 50/00; B60W 60/001
See application file for complete search history.

(56) References Cited

U.S. PATENT DOCUMENTS

| 2010/0138112 A1* | 6/2010 | Suzuki ................. B62D 15/025 |
| | | 701/42 |
| 2013/0060414 A1* | 3/2013 | Lee ........................ B62D 1/286 |
| | | 701/23 |

(Continued)

FOREIGN PATENT DOCUMENTS

| CN | 106715224 A | 5/2017 |
| CN | 112477871 A | 3/2021 |

(Continued)

OTHER PUBLICATIONS

Google English Translation of KR 20230126263 A (Year: 2023).*

(Continued)

*Primary Examiner* — James J Lee
*Assistant Examiner* — Andrew Sang Kim
(74) *Attorney, Agent, or Firm* — Crowell & Moring LLP

(57) ABSTRACT

A driving system for a motor vehicle with a steering wheel includes a hands-off driving function for automated driving, wherein the hands-off driving function in the active state allows hands-off driving operation with at least automated transverse guidance without contact of the steering wheel by the driver, and wherein during the automated transverse guidance an actuatable steering system can be actuated as a function of a setpoint signal on which the actuation is based. The driving system serves to generate the setpoint signal. A hands-on recognition device for recognizing a contact with the steering wheel by the driver and one or more hands-off safety mechanisms for securing the automated transverse guidance in hands-off driving operation are provided. The driving system is configured to deactivate the hands-off driving function without deactivating the at least one hands-off safety mechanism, to determine, by way of the hands-on recognition device, a contact of the steering wheel by the driver, and in response to determining the contact of the (Continued)

steering wheel by the driver, to deactivate also the one or more hands-off safety mechanisms.

10 Claims, 3 Drawing Sheets

(56) References Cited

U.S. PATENT DOCUMENTS

| | | | | |
|---|---|---|---|---|
| 2015/0120124 | A1* | 4/2015 | Bartels | B60W 50/082 |
| | | | | 701/23 |
| 2017/0305420 | A1* | 10/2017 | Desens | G05D 1/0238 |
| 2018/0088574 | A1* | 3/2018 | Latotzki | G05D 1/0251 |
| 2019/0025825 | A1* | 1/2019 | Takahama | B60W 30/16 |
| 2020/0004244 | A1* | 1/2020 | Mangal | B60W 40/04 |
| 2021/0070358 | A1 | 3/2021 | Eigel et al. | |
| 2021/0347371 | A1* | 11/2021 | Lee | B60W 50/029 |
| 2023/0060755 | A1* | 3/2023 | Bharmal | B60W 10/20 |

FOREIGN PATENT DOCUMENTS

| | | |
|---|---|---|
| CN | 113721600 A | 11/2021 |
| CN | 113734178 A | 12/2021 |
| DE | 10 2015 207 024 A1 | 10/2016 |
| DE | 10 2017 208 508 A1 | 11/2018 |
| DE | 10 2018 210 334 A1 | 1/2020 |
| DE | 10 2020 108 368 A1 | 9/2021 |
| KR | 20230126263 A * | 8/2023 |

OTHER PUBLICATIONS

German-language Search Report issued in German Application No. 10 2022 104 585.4 dated Oct. 20, 2022 with partial English translation (10 pages).

English translation of German-language Office Action issued in German Application No. 10 2022 104 585.4 dated Feb. 17, 2023 (four (4) pages).

English translation of Chinese-language Office Action issued in Chinese Application No. 202310162498.0 dated May 10, 2025 (12 pages).

* cited by examiner

DRIVING SYSTEM WITH SECURING OF AUTOMATED TRANSVERSE GUIDANCE IN HANDS-OFF DRIVING OPERATION, CORRESPONDING METHOD AND CORRESPONDING SOFTWARE

CROSS REFERENCE TO RELATED APPLICATION

This application claims priority under 35 U.S.C. § 119 from German Patent Application No. 102022104585.4, filed Feb. 25, 2022, the entire disclosure of which is herein expressly incorporated by reference.

BACKGROUND AND SUMMARY

The invention relates to a driving system with a hands-off driving function for automated driving for a motor vehicle with a steering wheel, wherein the hands-off driving function in the active state allows hands-off driving operation with at least automated transverse guidance without contact of the steering wheel by the driver.

Within the scope of the document, the term "automated driving" is understood to mean driving with automated longitudinal and/or transverse guidance. Automated driving can involve, for example, driving on the freeway for a longer period of time or driving for a limited period of time during parking. The term "automated driving" comprises automated driving with any degree of automation. Examples of degrees of automation are assisted, partially automated, highly automated, fully automated and autonomous driving (with an increasing degree of automation in each case). The above-mentioned five degrees of automation correspond to SAE levels 1 to 5 of the SAE J3016 (SAE—Society of Automotive Engineering) standard. In assisted driving (SAE level 1), the system performs longitudinal or transverse guidance in certain driving situations. In partially automated driving (SAE level 2), the system takes over the longitudinal and transverse guidance in certain driving situations, wherein the driver must permanently monitor the system like in assisted driving. In highly automated driving (SAE level 3), the system takes over the longitudinal and transverse guidance in certain driving situations without the driver having to permanently monitor the system; however, the driver must be able to take over the vehicle guidance in a certain time on request by the system. In fully automated driving (SAE level 4), the system takes over the vehicle guidance in certain driving situations, even if the driver does not react to a request for intervention, so that the driver is omitted as a fallback level. In autonomous driving (SAE level 5), the system can perform all aspects of the dynamic driving task under any carriageway and environmental conditions, which are also controlled by a human driver.

In the case of driving functions with at least automated transverse guidance in accordance with SAE levels 1 and 2, a distinction can be made between hands-on driving functions in which the driver must hold permanently (generally with tolerance of short interruptions) his hands (depending on the system design, also only one hand) on the steering wheel, and hands-off driving functions which allow hands-off driving operation with automated longitudinal and transverse guidance without contact of the steering wheel by the driver. Hands-off driving functions according to SAE level 2 are also referred to as level 2+ driving functions. Hands-off driving functions, in particular level 2+ driving functions, allow the driver a significant gain in comfort compared to corresponding hands-on driving functions, since the driver is relieved of the task of having to hold his hands on the steering wheel.

Driving functions according to SAE level 3, 4 or 5 are generally implemented as hands-off driving functions; in the case of vehicles provided for permanent automated driving operation according to SAE level 4 and level 5 (in particular so-called robot taxis), it is even possible to dispense with a steering wheel in the vehicle.

Driving systems for automated driving often each comprise a plurality of driving functions for automated driving with different degrees of automation, for example level 1, level 2, level 2+ or level 1, level 2, level 2+, level 3.

Driving systems for automated driving with at least automated transverse guidance, in which, for example, the contact of the steering wheel must be checked in the case of active hands-on driving functions, generally comprise a so-called hands-on recognition device for recognizing a contact of the steering wheel by the driver. For this purpose, in the steering wheel rim a capacitive or resistive sensor system, for example, is typically integrated in the steering wheel rim, which sensor system reacts to the contact of the steering wheel rim.

In the case of driving systems with a hands-off driving function, one or more hands-off safety mechanisms can be provided for securing the automated transverse guidance in the hands-off driving operation. The hands-off safety mechanism takes into account the fact that the driver no longer holds the steering wheel and thus cannot intervene without delay in the event of a fault in the automated transverse guidance. In this way, for example, a setpoint signal (for example setpoint curvature signal, setpoint steering angle signal) on which the actuation of a steering system is based can be secured, for example with respect to the steering wheel angle and/or the steering dynamics, in particular the magnitude of the setpoint signal and/or the change in time of the setpoint signal can be limited.

During the use of the hands-off driving function, the hands-off safety mechanism is then typically activated. If the hands-off driving function is deactivated and is no longer used because another driving function has been switched on (e.g. initiated by the driver via an operating action or initiated by the driving system, e.g. in a dangerous situation when a safety driving function is activated), these hands-off safety mechanisms should be switched off. The hands-off safety mechanism is in fact a hindrance to the driving function being taken over. The same applies if the hands-off driving function has been deactivated without activating another driving function (e.g. due to a fault in the steering system and/or due to a suitable operating action by the driver), as the hands-off safety mechanism impairs manual driving operation.

One object of the invention is to increase the safety of the driving system when the driving function is deactivated.

This object is achieved by the features of the independent patent claims. Advantageous embodiments are described in the dependent claims. It is pointed out that additional features of a patent claim dependent on an independent patent claim, without the features of the independent patent claim or in combination only with a subset of the features of the independent patent claim, may form a standalone invention independent of the combination of all of the features of the independent patent claim that may be made into the subject matter of a dependent claim, a divisional application or a subsequent application. This applies in the same way to technical teaching described in the description, which may form an invention independent of the features of the independent patent claims.

A first aspect of the invention relates to a driving system with a hands-off driving function for automated driving for a motor vehicle with a steering wheel, wherein the hands-off driving function in the active state allows hands-off driving operation with at least automated transverse guidance without contact of the steering wheel by the driver. In hands-off driving operation, the vehicle can therefore be operated permanently without contact of the steering wheel. The hands-off driving function is, for example, a level 2+ driving function. However, it would also be contemplated for the hands-off driving function to be an SAE level 3 driving function. Preferably, the driving system comprises in each case a plurality of driving functions for automated driving with a different degree of automation, for example SAE level 1, SAE level 2 as a hands-on driving function and level 2+ as a hands-off driving function.

During the automated transverse guidance, an actuatable electrical steering system can be actuated as a function of a setpoint signal on which the actuation is based. The steering system is, for example, an electrically driven power steering system (e.g. EPS—Electric Power Steering, EPAS—Electric Power Assisted Steering or EHPS=Electro-Hydraulic Power Steering). The electrical actuation signal used for the direct actuation of the steering system (e.g. steering angle setpoint signal which specifies the steering angle to be set) corresponds, for example, directly to the setpoint signal generated by the driving system or is determined as a function of the setpoint signal generated by the driving system (e.g. curvature setpoint signal which indicates the setpoint curvature of a trajectory to be driven by the driving function).

The driving system comprises a hands-on recognition device for recognizing a contact of the steering wheel by the driver. This comprises, for example, a (e.g. capacitive or resistive) sensor system integrated in the steering wheel rim, which reacts to the contact of the steering wheel rim. However, the term hands-on recognition device also comprises those implementations in which the contact of the steering wheel is determined by detecting a certain steering input (e.g. steering torque) applied by the driver, without a dedicated sensor system for hands-on recognition being integrated into the steering wheel itself.

Furthermore, one or more hands-off safety mechanisms are provided for securing the automated transverse guidance in hands-off driving operation, for example a first hands-off safety mechanism for securing the setpoint signal on which the actuation of a steering system is based. With the first hands-off safety mechanism, the setpoint signal (for example, the curvature setpoint signal, the steering angle setpoint signal) on which the actuation of the steering system is based can be secured, for example, with respect to the steering wheel angle or/and the steering dynamics, in particular the magnitude of the setpoint signal and/or the change in time of the setpoint signal can be limited.

The system is configured to perform various activities described below. This is typically done by means of one or more software-controlled devices, in particular electronic control units. Each of the one or more software-controlled devices can comprise one or more programmable processors which operate in a program-controlled manner in accordance with the invention via one or more software programs. The one or more hands-off safety mechanisms described above are also preferably implemented by software.

The driving system is configured to deactivate the hands-off driving function if necessary without deactivating the one or more hands-off safety mechanisms and to keep the one or more hands-off safety mechanisms active. For example, the hands-off driving function is automatically deactivated (e.g., if another driving function deactivates the hands-off driving function) or upon driver input (e.g., if the driver actuates an operating element for deactivating the hands-off driving function or for activating a driving function alternative to the hands-off driving function).

It is pointed out that special system states are contemplated in which (in contrast to the deactivation of the hands-off driving function according to the invention described above without deactivation of the one or more hands-off safety mechanisms) the one or more hands-off safety mechanisms are also deactivated directly with deactivation of the hands-off driving function. It is also pointed out that there may be other hands-off safety mechanisms in the driving system which generally behave differently from the hands-off safety mechanisms discussed in the context of the invention.

The driving system is preferably configured, before deactivating the hands-off driving function or with deactivation of the hands-off driving function, by means of a corresponding signal (for example optically, acoustically and/or haptically), to indicate to take again the steering wheel with one's hands.

At a time after triggering of the deactivation of the hands-off driving function (in particular after deactivation of the hands-off driving function), it is determined by means of the hands-on recognition device that the steering wheel has been touched by the driver, in particular in response to a corresponding indication.

Only after it has been determined that the driver is touching the steering wheel (again), the one or more hands-off safety mechanisms are also deactivated. For example, it is provided that a hands-off safety mechanism is deactivated in response to the fulfilment of the logical AND link, that the hands-off driving function is switched off AND the driver is touching the steering wheel again.

The hands-off driving function can therefore be shut down immediately; however, the one or more associated hands-off safety mechanisms are only shut down after the driver has taken over the steering (hands-on). In this way, the controllability and safety of the function shutdown or switch-over can be ensured.

In a first application scenario of the invention, for example, the driving system comprises, in addition to the hands-off driving function, a further driver assistance function, in particular a hands-on driver assistance function with hands-on driving operation. The further driver assistance function is preferably a function which, compared to the hands-off driving function (without taking into account the hands-off safety mechanism which limits the steering wheel angle and/or the steering dynamics), requests a greater maximum steering wheel angle and/or higher maximum steering dynamics. The driving system is preferably configured to shut down the hands-off driving function in order to activate the further driver assistance function, wherein only in response to determining the contact of the steering wheel by the driver is the hands-off safety mechanism deactivated, and the possibly greater maximum steering wheel angle and/or the higher maximum steering dynamics can only become effective when the hands-off safety mechanism is deactivated. Thus, if, for example, the hands-off driving function is deactivated because the other driver assistance function has been switched on (e.g. initiated by the driver via an operating action or initiated by the driving system itself, e.g. in a dangerous situation when the driver assistance function is automatically activated), the hands-off safety mechanism remains active until it has been recognized that the driver is touching the steering wheel again.

For example, a first hands-off safety mechanism in the form of a setpoint signal securing block with a securing function is provided for securing the setpoint signal on which the actuation of the steering system is based in hands-off driving operation. The setpoint signal securing block is preferably implemented in software. On the input side, the setpoint signal securing block receives a setpoint signal to be secured (e.g., a curvature setpoint signal) and, on the output side, outputs the setpoint signal secured by means of the securing function (e.g., a curvature setpoint signal). The setpoint signal securing block is configured, for example, to secure the setpoint signal to be secured with respect to the steering wheel angle and/or the steering dynamics, in particular to limit the magnitude of the setpoint signal and/or the change in time of the setpoint signal (for example in the case of a curvature setpoint signal).

Furthermore, the setpoint signal securing block receives a hands-on status signal which signals the contact of the steering wheel by the driver recognized via the hands-on recognition device. The setpoint signal securing block is configured to deactivate the securing function in response to a determination of the contact of the steering wheel by the driver on the basis of the changed hands-on status signal, so that the setpoint signal output on the output side is no longer secured by means of the securing function and the first hands-off safety mechanism is thus deactivated.

If, in a second application scenario of the invention, for example, the hands-off driving function is shut down due to a fault in the steering system, a hands-off safety mechanism remains active until it has been recognized that the driver is touching the steering wheel again. Thus, when the hands-off driving function is initially active, the hands-off driving function is deactivated in response to a fault in the steering system without deactivating the hands-off safety mechanism.

It can be provided that a steering-system-side hands-off safety mechanism is provided, which is activated or deactivated by the driving system as a function of a mode signal. If the mode signal signals hands-off driving operation, the steering-system-side hands-off safety mechanism is active. If the mode signal does not signal any hands-off driving operation, the steering-system-side hands-off safety mechanism is not active. In this case, the driving system preferably comprises a securing block as a further hands-off safety mechanism which cooperates with the steering-system-side hands-off safety mechanism and which receives an input-side mode signal on the input side and outputs an output-side mode signal on the output side. The steering system receives the output-side mode signal, wherein the steering-system-side third hands-off safety mechanism is switched on in the case of the output-side mode signal signaling the hands-off mode and is switched off in the case of the output-side mode signal signaling the hands-off mode. The securing block also receives a hands-on status signal which signals the contact of the steering wheel by the driver. In the case of an input-side mode signal which does not signal the hands-off mode, the setpoint signal securing block switches the output-side mode signal only in response to determining the contact of the steering wheel by the driver on the basis of the changed hands-on status signal over to an output-side mode signal which does not signal the hands-off mode. This is equivalent to a deactivation of the second hands-off safety mechanism as it now passes the changed mode signal over to the steering system. This will result in a deactivation of the steering-system-side hands-off safety mechanism. The interaction described above ensures that the steering-system-side hands-off safety mechanism is shut down only after touching the steering wheel. This prevents, for example, the steering-system-side hands-off safety mechanism from being switched off immediately when the hands-off driving function is shut down due to a fault in the steering system.

A second aspect of the invention relates to a method for automated driving for a motor vehicle with a steering wheel, wherein a hands-off driving function in the active state allows hands-off driving operation with at least automated transverse guidance without a contact of the steering wheel by the driver, and during the automated transverse guidance, an actuatable steering system can be actuated via a setpoint signal. The method comprises the following steps:

operating the hands-off driving function with one or more active hands-off safety mechanisms for securing the automated transverse guidance in hands-off driving operation, deactivating the hands-off driving function without deactivating the one or more hands-off safety mechanisms, determining a contact with the steering wheel by the driver, and in response to determining the contact of the steering wheel by the driver, deactivating the one or more hands-off safety mechanisms.

The above embodiments regarding the driving system in accordance with the invention according to the first aspect of the invention also apply in a corresponding manner to the method in accordance with the invention according to the second aspect of the invention. Advantageous exemplary embodiments of the method according to the invention which are not explicitly described here and in the patent claims correspond to the advantageous exemplary embodiments of the driving system according to the invention which are described above or described in the patent claims.

A third aspect of the invention relates to software with program code for carrying out the method according to the second aspect of the invention when the software runs on one or more software-controlled devices. A software-controlled device preferably comprises one or more programmable processors which process the program code of the software loaded into a main memory.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
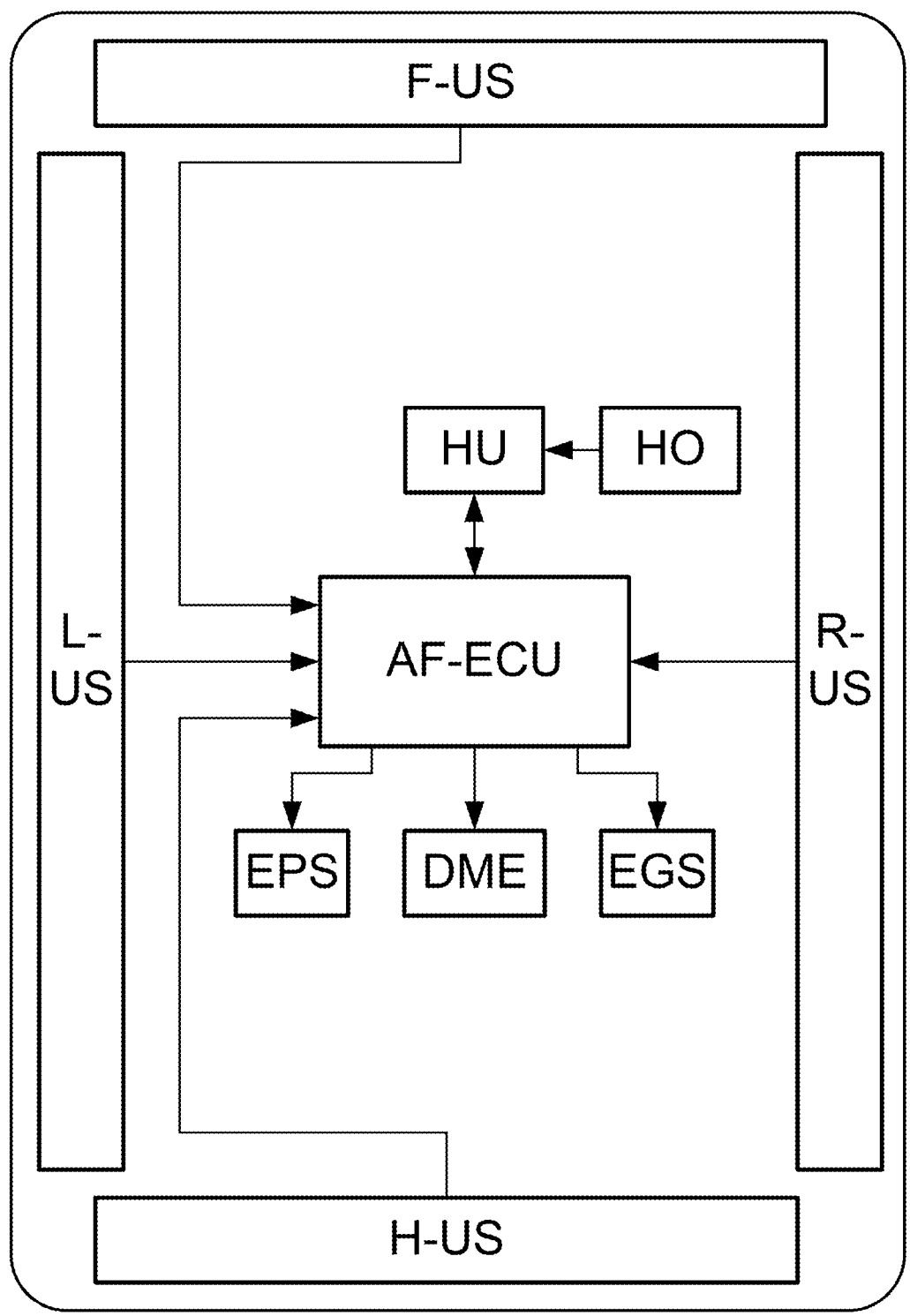
FIG. 1 shows an exemplary electronic control unit for automated driving, which receives environmental information and operating information and controls other functional units.

FIG. 1 shows a driving system for automated driving with an electronic control unit for automated driving AF-ECU, which receives environmental information and operating information and controls functional units.

Environment information from environment sensors F-US, L-US, R-US, H-US is received by the electronic control unit for automated driving AF-ECU. The electronic control unit for automated driving AF-ECU is connected to a control unit HU for outputting information to the driver (for example via a screen) and for receiving operating inputs. The control unit for automated driving AF-ECU controls a transmission control unit EGS, a steering control unit EPS of an electric steering system and a vehicle drive control unit DME. Furthermore, a hands-on recognition device HO is provided for recognizing a contact of the steering wheel by the driver, which generates a hands-on status signal S-HO indicating the contact of the steering wheel, which is forwarded via the control unit HU to the control unit AF-ECU.

Figure 2:
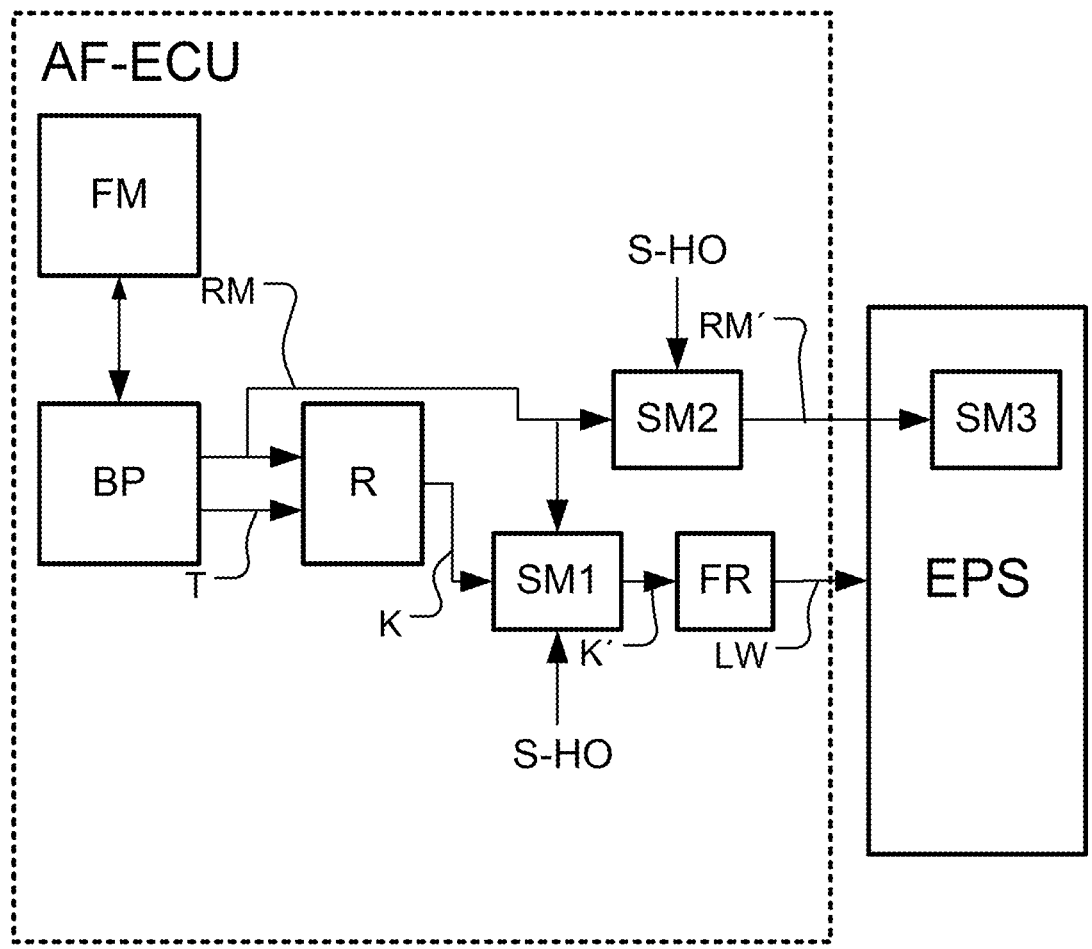
FIG. 2 shows an exemplary embodiment of an electronic control unit for automated driving.

FIG. 2 shows an exemplary implementation of a driving system according to the invention. The blocks represented within the control unit AF-ECU are preferably function blocks which are implemented in software which runs on one or more processors in the control unit AF-ECU. A function master FM serves, inter alia, for activating and deactivating driving functions of driving functions for automated driving which are supported by the driving system, in particular for activating and deactivating a hands-off driving function for automated driving (for example level 2+) and for controlling a path planning BP. The path planning BP generates a trajectory signal T which describes a trajectory to be traveled. Furthermore, the path planning BP outputs a control mode signal RM as a function of the driving function selected by the function master. The control mode signal RM signals whether or not hands-off driving operation (i.e. an active hands-off driving function, for example level 2+) has been selected by the function master FM. Furthermore, a controller R is provided which, by taking into account the trajectory signal T, generates a setpoint curvature signal K which describes the setpoint curvature of the path curve to be traveled.

Furthermore, a setpoint signal securing block SM1 with a securing function for securing the setpoint curvature signal K is provided as the first hands-off safety mechanism, which receives the setpoint curvature signal K to be secured on the input side and outputs a secured setpoint curvature signal K' on the output side, which is secured via a securing function during active hands-off driving operation (signaled via the control mode signal RM). Via the securing function of the setpoint signal securing block SM1, the setpoint curvature signal K is secured with respect to the steering wheel angle and/or the steering dynamics when the hands-off driving function is active, in that the magnitude of the setpoint signal and/or the change in time of the setpoint signal are then limited. Furthermore, the setpoint signal securing block SM1 also receives the hands-on status signal S-HO, which signals the contact of the steering wheel by the driver recognized via the hands-on recognition device HO. When the hands-off driving operation is shut down, the securing function can be deactivated in response to determining the contact of the steering wheel by the driver (via the hands-on status signal S-HO), so that the setpoint signal output on the output side, setpoint curvature signal K', is no longer secured by means of the securing function and corresponds to the setpoint curvature signal K. Furthermore, a transverse guidance vehicle controller FR is present, which receives the (secured) setpoint curvature signal K', reacts to interference signals (e.g., crosswind), and outputs a resulting setpoint steering angle signal LW. The setpoint steering angle signal LW is received as a setpoint signal by the steering control unit EPS of the electric steering system.

Furthermore, a second hands-off safety mechanism SM2 is provided in the control unit AF-ECU, which controls a steering-system-side hands-off safety mechanism SM3. The second hands-off safety mechanism SM2 receives the control mode signal RM and outputs an output-side control mode signal RM', which depends on the state of the received hands-on status signal S-HO. The second safety mechanism SM2 prevents the control mode signal from immediately deactivating the steering-system-side hands-off safety mechanism SM3 when the control mode signal RM is switched from the hands-off operation over to the hands-on operation. The steering control unit EPS receives the output-side control mode signal RM' and controls the state of the steering-system-side hands-off safety mechanism SM3 as a function of the control mode signal RM': In the case of a control mode signal RM' which signals an active hands-off driving mode, the steering system-side hands-off safety mechanism SM3 is switched on and otherwise switched off.

Figure 3:
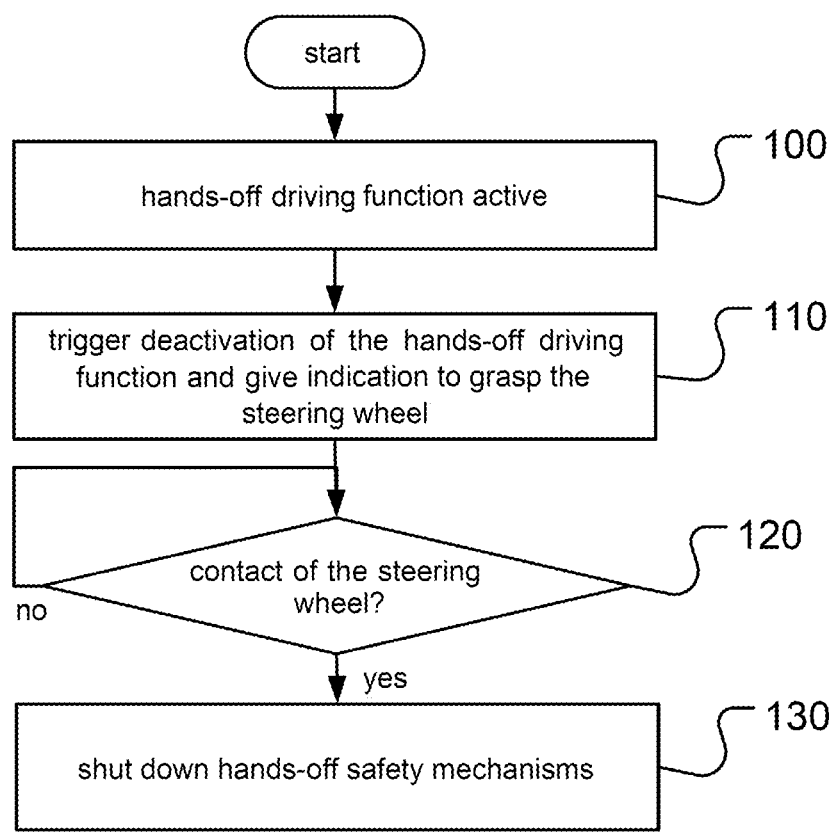
FIG. 3 shows an exemplary mode of operation of the exemplary embodiment illustrated in FIG. 2.

In the following explanation of the mode of operation of the driving system according to the invention in connection with FIG. 3, it is assumed that the vehicle is initially in hands-off driving operation with active hands-off driving function (for example level 2+) (see step 100 in FIG. 1). When the hands-off driving operation is active, the safety mechanism SM1 is active (controlled by the control mode signal RM) and limits the steering wheel angle and/or the steering dynamics. Furthermore, when the hands-off driving operation is active, the steering-system-side safety mechanism SM3 is active (controlled by the control mode signal RM'). When the steering-system-side safety mechanism SM3 is active, for example, the steering dynamics are reduced, for example in the event that the steering system causes a fault.

If the previously active hands-off driving function for automated driving is shut down via the function master FM (see step 110 in FIG. 3), for example because another driving function has been switched on (e.g. initiated by the driver via an operating action or initiated by the driving system, e.g. in a dangerous situation when a safety driving function is activated), these safety mechanisms SM1 and SM3 must be switched off. This is because these are a hindrance to the driving function being taken over. The same applies if the hands-off driving function has been deactivated without activating another driving function (e.g. due to a fault in the steering system and/or due to a suitable operating action by the driver), since these safety mechanisms SM1 and SM3 impair manual driving operation.

However, as part of the shutdown of the hands-off driving function via the function master FM, the hands-off safety mechanisms SM1 and SM3 are not deactivated immediately after the shutdown of the hands-off driving function. Instead, it is checked in the query 120 whether a contact of the steering wheel by the driver was determined by means of the hands-on recognition device HO after the driver was warned to grasp the steering wheel again before deactivating the hands-off driving function or with deactivation of the hands-off driving function (see step 110). When the driver has grasped the steering wheel again, the safety mechanisms SM1 and SM3 are shut down in step 130.

For this purpose, in FIG. 1 the securing function for limiting the steering wheel angle and/or the steering dynamics is shut down in the setpoint signal securing block SM1 (in spite of the presence of a control mode signal RM which already shows a hands-on driving operation) only when the hands-on status signal S-HO switches over and shows a grasping of the steering wheel.

After the control mode signal RM switches over to the hands-on mode when the hands-off driving function is shut down, however, the safety mechanism SM2 initially remains active and causes the output-side control mode signal RM' to be kept in the hands-off mode (despite the switched over control mode signal RM). Only when the hands-on status signal S-HO also switches over and shows a grasping of the steering wheel, the safety mechanism SM2 is also deactivated and the output-side control mode signal RM' switches over to the hands-on mode at the output of the safety mechanism SM2, so that the steering-system-side safety mechanism SM3 is deactivated in response to the switchover of the control mode signal RM'.

In a first exemplary scenario, during active hands-off driving operation, one of the hands-off driving functions is shut down by another driving function, which requires higher steering dynamics. In this case, the hands-off safety mechanisms remain active until the driver grasps the steering wheel and, in response thereto, shuts down the hands-off safety mechanisms.

In a second exemplary scenario, a fault occurs in the steering system during active hands-off driving operation, for example, a faulty steering intervention occurs, which is misinterpreted by the steering control unit EPS of the steering system by monitoring the steering torque as a steering intervention by the driver. The steering system EPS communicates the alleged steering intervention by the driver to the function master FM, which triggers a shutdown of the previously active hands-off driving function (since the function master FM assumes an intervention by the driver). Thereby the control mode is switched from the hands-off mode over to a hands-on mode and the control mode signal RM switches over accordingly at the input of the securing function SM2. Without the securing function SM2, the steering system with the shutdown would immediately receive information about a change in the control mode and deactivate the securing function SM3 in the steering control unit EPS of the steering system. With the securing function SM2, when the control mode signal RM is switched from hands-off mode over to hands-on mode, the control mode signal RM' at the output of the securing function is not immediately switched over, so that the securing function SM3 remains active in the steering system. The securing function SM1 is also still active. Only when the steering wheel is grasped and the hands-on status signal S-HO is switched over, the safety mechanism SM2 is deactivated, so that the control mode signal RM' at the output of the safety mechanism is switched over to hands-on and, in response thereto, also the securing function SM3 in the steering control unit EPS of the steering system is then deactivated. Furthermore, also the safety mechanism SM1 is then deactivated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving system providing a hands-off driving function for automated driving of a motor vehicle without driver contact with a steering wheel, comprising:
    a hands-on recognition device configured to generate a hands-on status signal in response to detecting contact with a steering wheel by a driver of the motor vehicle;
    a control unit configured to control the hands-off driving function, the control unit comprising:
        a control mode block configured to output a hands-on mode signal instructing an inactive state of the hands-off driving function, and a hands-off mode signal instructing an active state of the hands-off driving function,
        a control block configured to output a setpoint signal, and
        at least one hands-off safety mechanism configured to:
            in response to receiving the hands-off mode signal, apply a securing function to the setpoint signal received from the control block so as to output a secured setpoint signal in accordance with which the hands-off driving function controls a steering system of the motor vehicle via an automated transverse guidance, and
            in response to receiving the hands-on mode signal and the hands-on status signal, deactivate the securing function such that the setpoint signal is output in lieu of the secured setpoint signal,
            wherein the at least one hands-off safety mechanism does not deactivate the securing function in response to receiving the hands-on mode signal unless the hands-on status signal is also received.

2. The driving system of claim 1, wherein the at least one hands-off safety mechanism is configured to secure the setpoint signal with respect to the steering wheel angle and/or the steering dynamics, so as to limit a magnitude of the setpoint signal and/or a change in time of the setpoint signal.

3. The driving system of claim 1, further comprising:
    a further driving assistance function, wherein an attempted activation of the further driver assistance function causes the control mode block to output the hands-on mode signal.

4. The driving system of claim 3, wherein the further driving assistance function is a hands-on driving assistance function that requires hands-on driving operation.

5. The driving system of claim 3, wherein the further driving assistance function requires a greater maximum steering wheel angle and/or higher maximum steering dynamics than the hands-off driving function.

6. The driving system of claim 1, wherein the control mode block is configured to output the hands-on mode signal in response to a detected fault in the steering system.

7. The driving system of claim 1,
    wherein the steering system includes a steering-system-side hands-off safety mechanism configured to deactivate the steering system in response to receiving a deactivation signal, and
    wherein the at least one hands-off safety mechanism comprises a securing block, and
    wherein deactivation of the securing block includes the securing block transmitting a deactivation signal to the steering-system-side hands-off safety mechanism.

8. The driving system of claim 1, wherein the control unit is further configured to generate a warning to the driver to grasp the steering wheel when transitioning from the active state to the inactive state of the hands-off driving function.

9. A method for automated driving of a motor vehicle that includes a hands-on recognition device and a control unit comprising: a control block, a control mode block, and at least one hands-off safety mechanism, the method comprising:
    outputting a setpoint signal from the control block;

outputting from the control mode block a hands-off mode signal instructing an active state of a hands-off driving function for automated driving of the motor vehicle without driver contact with the steering wheel;
in response to receiving the hands-off mode signal, applying, by the at least one hands-off safety mechanism, a securing function to the setpoint signal received from the control block so as to output a secured setpoint signal in accordance with which the hands-off driving function controls a steering system of the motor vehicle via an automated transverse guidance;
outputting from the control mode block a hands-on mode signal instructing an inactive state of the hands-off driving function;
generating a hands-on status signal via the hands-on recognition device in response to detecting contact with a steering wheel by a driver of the motor vehicle; and
in response to receiving the hands-on mode signal and the hands-on status signal, deactivating the securing function such that the setpoint signal is output in lieu of the secured setpoint signal, wherein the at least one hands-off safety mechanism does not deactivate the securing function in response to receiving the hands-on mode signal unless the hands-on status signal is also received.

10. A non-transitory computer readable medium having stored thereon program code which, when executed by a computer device, carries out a method for automated driving of a motor vehicle that includes a hands-on recognition device and a control unit comprising: a control block, a control mode block, and at least one hands-off safety mechanism, the method comprising:
outputting a setpoint signal from the control block;
outputting from the control mode block a hands-off mode signal instructing an active state of a hands-off driving function for automated driving of the motor vehicle without driver contact with the steering wheel;
in response to receiving the hands-off mode signal, applying, by the at least one hands-off safety mechanism, a securing function to the setpoint signal received from the control block so as to output a secured setpoint signal in accordance with which the hands-off driving function controls a steering system of the motor vehicle via an automated transverse guidance;
outputting from the control mode block the hands-on mode signal instructing an inactive state of the hands-off driving function;
generating a hands-on status signal via a hands-on recognition device in response to detecting contact with a steering wheel by a driver of the motor vehicle; and
in response to receiving the hands-on mode signal and the hands-on status signal, deactivating the securing function such that the setpoint signal is output in lieu of the secured setpoint signal, wherein the at least one hands-off safety mechanism does not deactivate the securing function in response to receiving the hands-on mode signal unless the hands-on status signal is also received.

* * * * *